United States Patent

Schroeder

[15] 3,683,255

[45] Aug. 8, 1972

[54] POWER SOURCE FOR METHANE MONITOR SYSTEM

[72] Inventor: William E. Schroeder, Pittsburgh, Pa.

[73] Assignee: Schroeder Brothers Corporation, McKee Rocks, Pa.

[22] Filed: Dec. 21, 1970

[21] Appl. No.: 100,167

[52] U.S. Cl. ..................320/2, 299/12, 317/18 C
[51] Int. Cl. ...............................................E21f 9/00
[58] Field of Search ............320/2, 14, 48; 318/139; 317/18 C; 290/50, 43; 180/53, 65, 66, 6.5, 77 MC; 105/50; 322/35; 299/12

[56] References Cited

UNITED STATES PATENTS

| 3,196,316 | 7/1965 | Crom | 317/18 C |
| 3,138,741 | 6/1964 | Scott | 317/18 C |
| 3,512,072 | 5/1970 | Karazija | 290/50 X |
| 2,689,719 | 9/1954 | Baldwin | 180/66 X |

Primary Examiner—J. D. Miller
Assistant Examiner—Robert J. Hickey
Attorney—Webb, Burden, Robinson & Webb

[57] ABSTRACT

A constant voltage DC power source for operating a methane monitoring system for mining equipment and the like. A hydraulic motor teed from the main hydraulic system of the mining equipment is connected in series with a flow control element. In this way, the hydraulic motor turns fast enough to cause a generator to charge a storage battery during only periods of high pressure. The field of the generator is controlled by a voltage regulator which limits the voltage in the storage battery to a preset level. The storage battery supplies constant DC current to the monitoring system.

4 Claims, 1 Drawing Figure

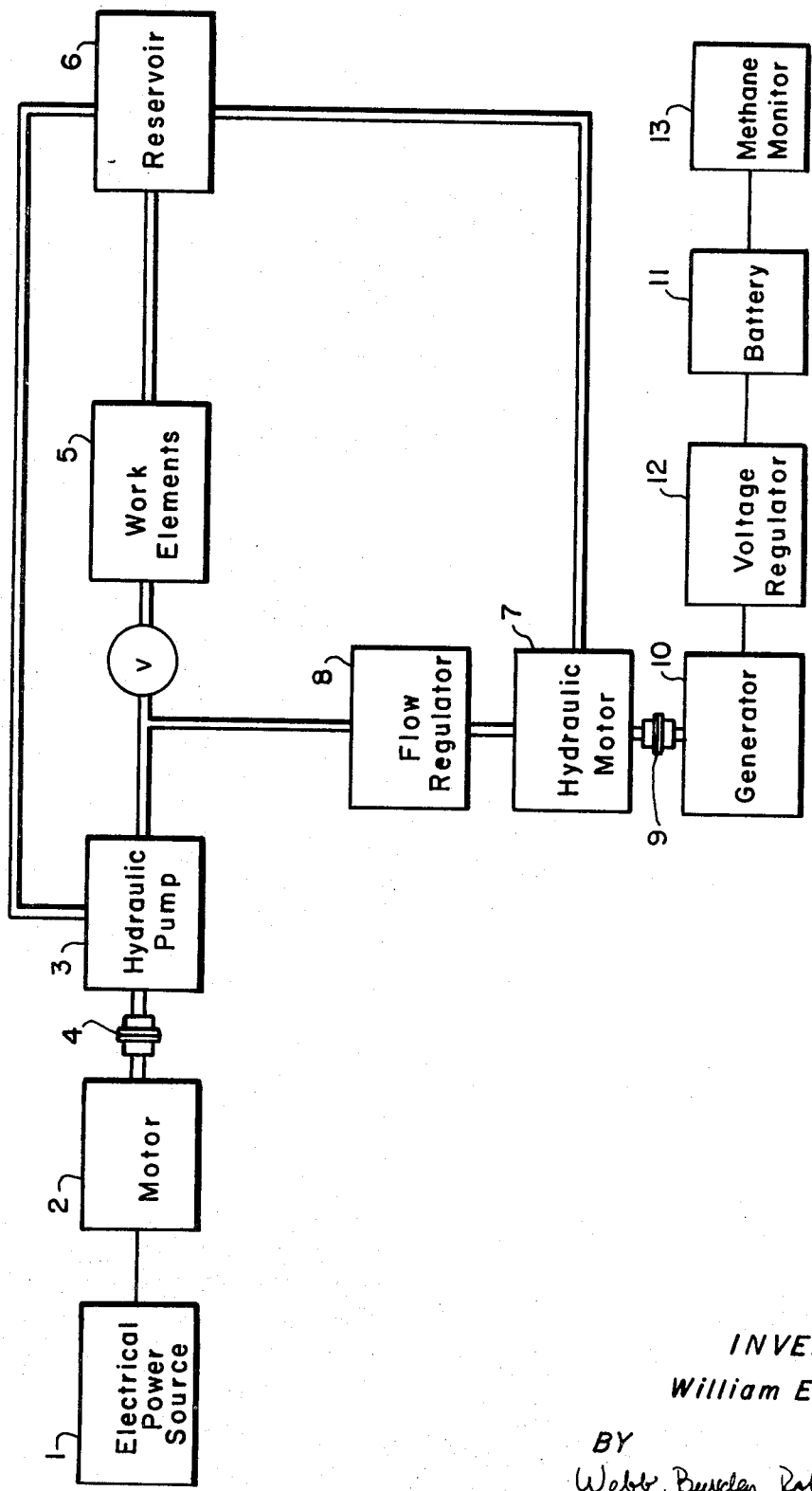
INVENTOR.
William E. Schroeder
BY
Webb, Burden, Robinson & Webb
HIS ATTORNEYS

POWER SOURCE FOR METHANE MONITOR SYSTEM

BACKGROUND

In this day and age, the on-the-job safety of workmen has become of increasing concern. Recently, considerable legislation and public opinion has been directed against unsafe practices in coal mines. One of the chief dangers in coal mines is explosion caused by an accumulation of methane ignited by electrical sparks associated with mining machinery. To minimize the danger of a methane explosion around mining machinery, some pieces of mining equipment are provided with a methane monitoring system to appraise the operators of the methane content in the air and to shut down the machine when the level of methane is dangerously high.

There are several types of methane monitoring systems. One such system comprises a housing having a multiple screen flame arrestor enabling methane in the adjacent air to enter the housing. The housing contains a coil of platinum wire which is connected to one leg of a balanced Wheatstone bridge. The leg is heated by electrical current. Methane is burned when it comes in contact with the catalytic surface of the wire thereby raising the temperature of the wire and raising the wire's electrical resistance. The change in resistance causes the Wheatstone bridge to become unbalanced. The degree of unbalance is proportional to the amount of methane present. Typically, a reference wire not in contact with the methane comprises an adjacent leg of the Wheatstone bridge. This serves to compensate for variations in the ambient temperature, voltage and for changes in resistance due to aging. Such precautions are necessary because of the sensitive nature of the Wheatstone bridge.

The Wheatstone bridge requires a steady voltage direct current input. A typical methane monitoring system as described above requires a 12 volt input. It has been found that in many mines where high voltage DC current is used to operate mining equipment within the mine, it is expensive and difficult to step down the direct current to a voltage level which is useful for operating the Wheatstone bridge in the methane monitoring device and at the same time provide a constant voltage current. The start-up or turn-off of large motors on pieces of equipment in even remote areas of the mine will cause high transient direct current voltages, sometimes called spikes. The fluctuations, transmitted to methane monitors can cause the destruction of certain components of the monitor circuit.

According to this invention, there is provided a system for providing constant DC power to a methane monitor incorporating a Wheatstone bridge. The system is arranged to operate off the main hydraulic system on mining equipment without interfering therewith. The main hydraulic system operates hydraulic cylinders for positioning machine elements such as cutting heads and hydraulic motors for various purposes such as tramming. For convenience, the hydraulic cylinders and motors are referred to hereafter as the main hydraulic work elements. The amount of hydraulic power needed to operate the monitor power system according to this invention is very small compared to the total hydraulic power used when the mining equipment or machinery is in operation. It is an advantage according to this invention that the monitor power system is not in line with the main hydraulic power supply. It is a further advantage that the hydraulic pump supplying the hydraulic system is not operated at full power except when the main hydraulic system is in use.

Briefly, the power system according to this invention comprises the power source which drives a motor. High voltage DC power is very common in mines, and in these instances the motor must, of course, be a DC motor. The motor is mechanically linked to a hydraulic pump which is part of the main hydraulic system including a reservoir and the main hydraulic work elements. A hydraulic motor is teed off the main circuit between the pump outlet and the main hydraulic work elements. Connected in series between the pump and the motor is a flow control element for limiting the flow of hydraulic fluid to the motor. The hydraulic motor is mechanically connected to a direct current generator or alternator which charges a storage battery. Basically, the flow control element only permits sufficient hydraulic fluid to pass to the motor and thereby turn the generator at an established maximum speed. The generator will only turn at generating speeds when the pressure in the main hydraulic system is above a preset or selected level. A voltage regulator prevents the charging of the storage battery at a voltage above a preset or selected level and maintains a proper rate of charge. The storage battery then has the capability of supplying uniform voltage direct current to the methane monitoring system.

According to a preferred embodiment of this invention, the monitor power source comprises a hydraulic pump used with closed center valves. The main hydraulic system is arranged not to freely discharge into the reservoir during non-working periods, i.e., when the main working elements are not using hydraulic power. In this way, the pressure in the main hydraulic system is at maximum or peak pressure during the non-working period. The increased hydraulic pressure is sufficient to feed the hydraulic motor during periods when the main hydraulic working elements are not in use.

According to yet another preferred embodiment of this invention, the monitor power source comprises a hydraulic pump with open center valves. In this instance the main hydraulic system freely discharges into the reservoir during non-working periods thereby resulting in increased pressures only during working periods. The increased hydraulic pressure then is sufficient to feed the hydraulic motor during periods when the main hydraulic working elements are in use.

Further features and other objects and advantages of this invention will become apparent from a study of the following detailed description made with reference to the drawing in which:

The single FIG. of the drawing is a schematic diagram representing power supply systems according to this invention.

Referring to the drawing, a DC power source 1 feeds direct current to an electrical motor 2 which drives a hydraulic pump 3. The drive 4 between the motor 2 and the hydraulic pump 3 is mechanical. The hydraulic pump is part of the main hydraulic work system which includes main hydraulic work elements 5 and a reservoir 6. The main hydraulic work elements are hydraulically connected between the hydraulic pump 3 and the reservoir 6. The inlet of the pump is connected by conduits to the reservoir 6. A hydraulic motor 7 is connected by a tee connection to the outlet of hydraulic pump 3 through a flow control or regulator 8. The flow control and hydraulic motor are out of line with the main hydraulic work elements. By analogy to electrical systems, one could say they were connected in parallel with the hydraulic work elements. A conduit connects the hydraulic motor to the reservoir 6. The hydraulic motor drives a means for generating direct current, such as generator 10. An alternator or magneto could also be used. The linkage 9 between the hydraulic motor and the generator is mechanical. The generator charges a battery 11. The field of the generator is controlled by a voltage regulator 12 such that the battery is charged to a preset level. The battery is then capable of supplying direct current voltage at a constant level to a methane monitor 13.

According to one embodiment of this invention, the hydraulic pump is a pressure compensating controlled pump or variable volume pump. The system supplied by this pump has a lower pressure during work periods and a higher pressure during idle periods. Pressure compensating controlled pumps are controlled automatically and regulate the volumes delivered to the system, for example, by changing the length of the stroke of the pumping pistons. The stroke change is controlled solely by a system of pressure in a manner that when the pump is operating at a pressure less than the maximum setting, the pump delivers greater volume. When the maximum pressure setting is reached, the volume is automatically reduced to the amount of flow required to maintain the pressure throughout the working system. The pressure at which these changes take place is easily regulated by an adjustment in a manner well-known in the art.

The flow control may take many forms. A plain orifice may be used. I prefer to use pressure compensated flow control valves which are designed such that differential pressure changes across the valves effect the internal control area of the valves which in turn limits the flow to a maximum amount. It should be understood that the pressure compensated flow control valves may generally pass hydraulic fluid at all pressures but the flow is only sufficient to cause the hydraulic motor to turn the generator at generating speed when the pressure exceeds a certain level as established by the displacement and torque output of the motor and the torque requirements of the generator or alternator.

Having thus defined my invention in detail and with the particularity required by the patent laws, what is desired protected by Letters Patent is set forth in the following claims.

I claim:

1. In mining machinery or the like having a methane monitoring device and a main hydraulic system, said hydraulic system comprising a hydraulic pump, main hydraulic work elements, connecting conduit and hydraulic fluid, the improvement comprising a power source for the methane monitoring device, said power source comprising a hydraulic motor connected to the hydraulic pump in parallel with the main work elements, means for generating direct current connected to said hydraulic motor, means comprising a control element for limiting the flow of hydraulic fluid to said hydraulic motor, a storage battery charged by said hydraulically driven generating means, and a voltage regulator to limit charging of the battery to a preset voltage whereby said battery is capable of supplying uniform direct current voltage to said methane monitoring device.

2. The improvement according to claim 1 in which the work system includes closed center valves which prevent free discharge of hydraulic fluid to the reservoir during non-working periods thereby resulting in increased pressures during non-working periods whereby the hydraulic motor operates at a speed to cause charging of the battery by the generator.

3. The improvement according to claim 1 in which the work system includes open center valves which permit free discharge of hydraulic fluid into the reservoir during non-working periods thereby resulting in increased pressures during working periods whereby the hydraulic motor operates at a speed to cause charging of the battery by the generator.

4. In mining machinery or the like power by direct current having a methane monitoring device and a main hydraulic system, said hydraulic system comprising a hydraulic pump, main hydraulic work elements, connecting conduit and hydraulic fluid, the improvement comprising a power source for the methane monitoring device of the type having a wheatstone bridge, said power source comprising a hydraulic motor connected to the hydraulic pump in parallel with the main work elements, means for generating direct current connected to said hydraulic motor, means comprising a control element for limiting the flow of hydraulic fluid to said hydraulic motor, a storage battery charged by said hydraulically driven generating means, and a voltage regulator to limit charging of the battery to a preset voltage whereby said battery is capable of supplying uniform direct current voltage to said methane monitoring device.

* * * * *